(12) United States Patent
Fujikawa et al.

(10) Patent No.: US 7,541,973 B2
(45) Date of Patent: Jun. 2, 2009

(54) RADAR APPARATUS FOR COMBINING AND DISPLAYING DATA FROM A PLURALITY OF RADAR ANTENNAS

(75) Inventors: Takumi Fujikawa, Nishinomiya (JP); Sae (Shibata) Takemoto, Nishinomiya (JP); Ichiya Ogino, Nishinomiya (JP); Takashi Inaoka, Nishinomiya (JP); Motoji Kondo, Nishinomiya (JP)

(73) Assignee: Furno Electric Company Limited, Nishinomiya-City (JP)

( * ) Notice: Subject to any disclaimer, the term of this patent is extended or adjusted under 35 U.S.C. 154(b) by 138 days.

(21) Appl. No.: 11/406,236

(22) Filed: Apr. 19, 2006

(65) Prior Publication Data

US 2007/0018888 A1 Jan. 25, 2007

(30) Foreign Application Priority Data

Apr. 20, 2005 (JP) .............................. 2005-122683

(51) Int. Cl.
*G01S 13/89* (2006.01)
*G01S 7/04* (2006.01)

(52) U.S. Cl. ..................... 342/179; 342/59; 342/176; 342/185

(58) Field of Classification Search ................. 342/59, 342/176, 179, 185, 360
See application file for complete search history.

(56) References Cited

U.S. PATENT DOCUMENTS 5,036,326 A * 7/1991 Andrieu et al. ............. 342/176
5,742,297 A * 4/1998 Logan ......................... 345/672
5,923,285 A * 7/1999 Andrusiak et al. .......... 342/177
6,211,814 B1 * 4/2001 Benjamin et al. ........... 342/185
6,697,015 B2 * 2/2004 Kiya ........................... 342/176

FOREIGN PATENT DOCUMENTS

JP 4-238285 A 8/1992
JP 10-332810 A 12/1998

* cited by examiner

*Primary Examiner*—Thomas H Tarcza
*Assistant Examiner*—Cassi Galt
(74) *Attorney, Agent, or Firm*—Birch, Stewart Kolasch & Birch, LLP

(57) ABSTRACT

A radar apparatus is provided which correctly combines and displays detected data obtained from a plurality of radar antennas. Detected data obtained from a radar antenna 11 is subjected to a correlation process in a correlator 91A. Detected data obtained from a radar antenna 21 is subjected to a correlation process in a correlator 91B. A mask image which designates the same address as that of the correlated data from the radar antenna 21 is set by a mask area generator 32 and is written into a mask image memory 62. For the correlated data from the correlators 91A and 91B, addresses corresponding to installed positions of the radar antennas 11 and 21 are set. For a process image memory 902B of the correlator 91B and the mask image memory 62, a common address is set. Correlated data input in accordance with mask data is stored in a display image memory 61 in accordance with an address set in a display screen and is also output to a display device 10.

2 Claims, 15 Drawing Sheets

-Prior Art-

RADAR APPARATUS FOR COMBINING AND DISPLAYING DATA FROM A PLURALITY OF RADAR ANTENNAS

CROSS REFERENCE OF RELATED APPLICATION

Japanese Patent Application Tokugan No.2005-122683 is hereby incorporated by reference.

BACKGROUND OF THE INVENTION

1. Field of the Invention

The present invention relates to a radar apparatus and a sonar apparatus which output detected image data based on a detected signal to a display device, and apparatuses similar thereto.

2. Description of the Related Art

Conventionally, image processing which executes a correlation process with respect to images obtained by several past scanning operations is performed so as to suppress an unnecessary video, such as sea surface reflection or the like. This process is referred to as "scan correlation process".

A radar apparatus which is carried on a mobile object, such as a ship or the like, needs to stabilize a change in course and a change in position before performing a correlation process, and therefore, receives compass data for detecting a ship's head, and velocity or latitude and longitude data for detecting a change in position, and uses these data values to generate an address in an image memory for the correlation process. Specifically, a sweep direction ($\theta$) is assumed to be equal to a value ($\theta=\theta r+\theta c$) obtained by adding the ship's head ($\theta c$) with an antenna's relative direction ($\theta r$) where the ship's head is used as a reference, and a sweep start point position is changed corresponding to a movement amount of the mobile object, thereby generating an address in the correlation process image memory. In other words, the address start point for the scan correlation process is a true motion coordinate point. Although this should be described in the following description, this complicates the description of the present invention and is also known, and will not herein described in detail.

FIG. 12 is a block diagram illustrating a configuration of a conventional general radar apparatus.

The conventional radar apparatus includes a radar antenna 101, a receiver 102, an AD converter 103, a sweep memory 104, a drawing start point generator 105, a drawing address generator 106, a display image memory 107, and a display device 108.

The radar antenna 101 transmits a transmission signal composed of pulsed radio waves in predetermined transmission cycles while rotating on a horizontal plane in predetermined cycles. At the same time, the radar antenna 101 receives radio waves reflected from a target present within a detection area. The receiver 102 detects and amplifies the received signal and outputs a detected signal. The AD converter 103 subjects the detected signal to AD conversion to generate detected data represented by a polar coordinate system. The sweep memory 104 stores one sweep of detected data based on a distance in real time. The sweep memory 104 outputs one sweep of detected data thus stored to the display image memory 107 by the time when detected data obtained by the next transmission is received. The drawing start point generator 105 sets a draw start point address (Xs, Ys) for detected image data which is to be drawn in the display image memory 107, and outputs the draw start point address (Xs, Ys) to the drawing address generator 106.

The drawing address generator 106 generates addresses which designate pixels in the display image memory 107 arranged in a corresponding rectangular coordinate system, based on an antenna angle $\theta$ where a predetermined direction (e.g., a ship's head) is used as a reference, and a read position r in the sweep memory 104 stored based on a distance, directing outward from a sweep start point as a start address. Specifically, the drawing address generator 106 is composed of hardware which realizes the following expressions.

$$X = Xs + r \cdot \sin\theta$$

$$Y = Ys + r \cdot \cos\theta$$

where X and Y are an address which designates a pixel in the display image memory 107, Xs and Ys are the above-described draw start point address, r is a distance from the center of sweep, and $\theta$ is a sweep angle.

The display image memory 107 has a capacity which can store detected image data corresponding to one revolution of the antenna. The data is read out from the display image memory 107 with high speed in synchronization with raster scanning of the display device 108 performed by a display controller (not shown). The detected image data thus read is assigned with an intensity or color corresponding thereto, and is output as display image data to the display device 108. The display device 108 displays an image on a screen based on the received display image data.

In the case of a target detecting system using such a radar apparatus, if a structure which reflects radio waves is present near the antenna, the structure obstructs detection of a target behind the structure as viewed from the antenna. FIG. 13 is a schematic diagram illustrating an area which cannot be detected due to the positional relationship between an antenna installed position and an obstruction. For example, as illustrated in FIG. 13, when containers 201 are stacked on the deck of a ship body 200, and the radar antenna 101 is installed above a wheelhouse positioned at the stern of the ship body 200, radio waves transmitted from the radar antenna 101 are interrupted by the container 201, so that a target present in a predetermined area 210 cannot be detected.

The radar has a more satisfactory long-range detection capability as the radar antenna position is made higher. Conversely, the higher radar antenna position leads to a wider range of sea surface reflection video captured. On the other hand, the short-range detection capability of the radar depends on the vertical beam width of the radar, and is more satisfactory as the radar antenna position is made lower.

Therefore, a plurality of radar antennas are provided, videos received by the radar antennas are displayed on respective display devices, and a display device suitable for an observation purpose is selected among these display devices and is observed. FIG. 14 is a schematic diagram illustrating a detectable area when two radar antennas 101 and 111 are provided. In the example of FIG. 14, by installing the radar antenna 111 at the bow of the ship body 200, an area corresponding to the area 210 of FIG. 13 is detected by the radar antenna 111, thereby removing the non-detectable area. In addition, the radar antenna 101 is installed at a high position, and the radar antenna 111 is installed at a low position, thereby making it possible to achieve both long-range and short-range detection capabilities.

As illustrated in FIG. 15, there is an apparatus in which the radar antennas 101 and 111 are connected via a switch module 303 to two display devices 108 and 118. FIG. 15 is a schematic diagram illustrating a configuration of a radar apparatus which switches and displays a plurality of detected images using the switch module 303.

JP No. H4-238285A discloses another conventional radar apparatus which includes a plurality of radar antennas, and outputs detected data obtained from these radar antennas to a single display device.

However, in the case of the conventional configuration comprising a plurality of radar antennas of FIG. 14, a display device is typically provided for each antenna. Therefore, the operator needs to observe targets in detection areas while viewing the display devices separately, depending on the situation.

In the configuration of FIG. 15, the switch module 303 connects receivers 301 and 302 to the respective display devices 108 and 118 in one-to-one correspondence. Therefore, each display device can display a detected image from only either of the radar antennas.

In the radar apparatus described in JP No. H04-238285A, the same (single) draw center is used for detected data obtained from a plurality of radar antennas. However, when images obtained from a plurality of radar antennas installed at separate places are combined and displayed on a single display device, and the same position is used as a draw center, an image of the same target is displayed at a plurality of different positions on the display device, resulting in an incorrect image. In such a case, the draw centers of the received images need to be placed at different positions corresponding to the respective antenna installed positions. An error in the above-described display position increases with an increase in a distance with which the installed positions of the radar antennas are separated from each other, or with a decrease in a detection range within which observation is performed.

SUMMARY OF THE INVENTION

Therefore, an object of the present invention is to provide a radar apparatus which correctly combines and displays detected data obtained from a plurality of radar antennas on a single display device, and apparatuses similar thereto.

The present invention provides a radar apparatus or like comprising a plurality of detected data generators respectively corresponding to a plurality of antennas installed at different positions, for generating detected data using detected signals from the respective antennas, a drawing area configurator for setting a drawing area for each piece of detected data generated by the detected data generator, and a detected data synthesizer for combining a plurality of pieces of detected data generated by the detected data generator, based on drawing areas for respective pieces of detected data set by the drawing area configurator, wherein draw start point positions respectively corresponding to the installed positions of the plurality of antennas are used as references.

In this configuration, detected data is generated for each antenna based on a detected signal received by the antenna. The detected data generated by the antennas are combined by the detected data synthesizer, so that the detected data are drawn in the respective drawing areas set by the drawing area configurator. In this case, the detected data synthesizer combines each piece of detected data, where the draw start point positions respectively corresponding to the installed positions of the antennas are used as references.

Also, the present invention provides A radar apparatus or like comprising a plurality of detected data generators respectively corresponding to a plurality of antennas installed at different positions, for generating detected data represented by a polar coordinate system using detected signals from the respective antennas, a plurality of drawing address generators respectively corresponding to the plurality of antennas, for setting drawing addresses represented by a rectangular coordinate system corresponding to respective antenna relative positions with respect to an image data storing memory, using azimuth information from the respective antennas, draw start point position information corresponding to the installed positions of the respective antennas, and distance information from a draw start point to a draw position, a specific area configurator corresponding to a specific antenna, for setting an area in which detected data obtained by the specific antenna is drawn, using azimuth information from the specific antenna, draw start point position information corresponding to the installed position of the specific antenna, and distance information from a draw start point to a draw position, a detected data selector for writing detected data obtained from the specific antenna into the image data storing memory at a drawing address set by the corresponding drawing address generator, for the specific area set by the specific area configurator, and writing detected data obtained by an antenna other than the specific antenna in the image data storing memory at a drawing address set by the corresponding drawing address generator, for another area, and the image data storing memory having addresses represented by a rectangular coordinate system, for storing detected data from the detected data selector as detected image data represented by the rectangular coordinate system.

In this configuration, detected signals received by the respective antennas are input to the detected data generator provided for the respective antennas.

The detected data generator generates detected data represented by a polar coordinate system from a received detected signal and buffers and outputs the detected data in units of one sweep.

The antenna azimuth information output by the antennas are input to the drawing address generator provided for the respective antennas.

The drawing address generator generate and output drawing addresses represented by a rectangular coordinate system of the image data storing memory using the antenna azimuth information, the draw start point position information corresponding to the installed positions of the respective antennas, the distance information from a draw start point to a draw position, and the draw start point position information corresponding to the installed positions of the connected antennas.

The specific area configurator is connected to a specific antenna, and outputs a specific area in which detected data from the specific antenna is drawn, using the azimuth information from the specific antenna, the draw start point position information corresponding to the installed position of the specific antenna, the distance information from a draw start point to a draw position, and an area set value.

For the specific area set by the specific area configurator, the detected data selector outputs detected data obtained by an antenna corresponding to the specific area configurator to the image data storing memory. On the other hand, for an area which is not set by the specific area configurator, the detected data selector outputs detected data obtained from an antenna different from the antenna connected to the specific area configurator to the image data storing memory. In these cases, detected data is assigned with an address obtained from a corresponding antenna.

The image data storing memory stores the detected data thus selected as detected image data composed of addresses represented by a rectangular coordinate system. In this case, the drawing address generator performs coordinate conversion corresponding to each antenna position, so that a positional relationship between detected image data from the plurality of antennas which are stored in the image data storing memory corresponds to an antenna installed position relationship. Thus, detected image data stored corresponding to the antenna installed position relationship is read out by a display controller and is displayed on a display device.

Also, the present invention provides A radar apparatus or like comprising a plurality of detected data generators respectively corresponding to a plurality of antennas installed at different positions, for generating detected data represented by a polar coordinate system using detected signals from the respective antennas, a plurality of drawing address generators respectively corresponding to the plurality of antennas, for setting drawing addresses represented by a rectangular coordinate system with respect to respective corresponding image data storing memories, using azimuth information from the respective antennas, draw start point position information corresponding to the installed positions of the respective antennas, and distance information from a draw start point to a draw position, the plurality of image data storing memories having addresses represented by a rectangular coordinate system, for storing detected data from the plurality of detected data generators as detected image data represented by the rectangular coordinate system based on addresses set by the respectively corresponding drawing address generator, a specific area configurator corresponding to a specific antenna, for setting an area in which detected data obtained by the specific antenna is drawn, using azimuth information from the specific antenna, draw start point position information corresponding to the installed position of the specific antenna, distance information from a draw start point to a draw position and an area set value, and an output data selector for selecting and outputting detected image data from an image data storing memory corresponding to the specific antenna, for an area set by the specific area configurator, and selecting and outputting detected image data from an image data storing memory corresponding to an antenna other than the specific antenna, for another area.

In this configuration, detected signals received by the respective antennas are input to the detected data generator provided for the respective antennas.

The detected data generator generates detected data represented by a polar coordinate system from a received detected signal and buffers and outputs the detected data in units of one sweep.

The antenna azimuth information output by the antennas are input to the drawing address generator provided for the respective antennas.

The drawing address generator generate and output drawing addresses represented by a rectangular coordinate system of the image data storing memory using the antenna azimuth information, the distance information from a draw start point to a draw position, and the draw start point position information corresponding to the installed positions of the connected antennas.

Each image data storing memory stores detected image data represented by a rectangular coordinate system based on detected data from the detected data generator connected thereto, using an address set by the drawing address generator connected thereto. In other words, the image data storing memory provided for each antenna stores only detected image data obtained from the corresponding antenna. In this case, addresses of all the image data storing memory are set, corresponding to the installed position of the respective antennas.

The specific area configurator is connected to a specific antenna, and outputs a specific area in which detected data from the specific antenna is drawn, using the azimuth information from the specific antenna, the draw start point position information corresponding to the installed position of the specific antenna, the distance information from a draw start point to a draw position, and an area set value.

The output data selector selects and outputs detected image data from each image data storing memory in accordance with a specific area set by the specific area configurator. Thus, detected image data stored corresponding to an antenna installed position relationship, is selected by the output data selector and is displayed on a display device.

Also, the present invention provides A radar apparatus or like comprising a plurality of detected data generators respectively corresponding to a plurality of antennas installed at different positions, for generating detected data represented by a polar coordinate system using detected signals from the respective antennas, a plurality of drawing address generators respectively corresponding to the plurality of antennas, for setting drawing addresses represented by a rectangular coordinate system corresponding to respective antenna relative positions, using azimuth information from the respective antennas, draw start point position information corresponding to the installed positions of the respective antennas, and distance information from a draw start point to a draw position, an address selector for selecting the drawing addresses set by the plurality of drawing address generators, and outputting the drawing addresses as drawing addresses or read addresses to a plurality of image data storing memories, a plurality of correlators for subjecting the detected data from the respectively corresponding detected data generators to a correlation process, and storing the resultant data as correlated data represented by a rectangular coordinate system based on the addresses set by the address selector, a specific area configurator corresponding to a specific antenna, for setting an area in which detected data obtained by the specific antenna is drawn, using azimuth information from the specific antenna, draw start point position information corresponding to the installed position of the specific antenna, and distance information from a draw start point to a draw position, a display image data selector for, among the correlated data output from the plurality of correlators in accordance with a drawing address obtained from one predetermined antenna, selecting and outputting correlated data from a correlator corresponding to the specific antenna to a display image data storing memory, for the area set by the specific area configurator, and selecting and outputting correlated data from a correlator corresponding to an antenna other than the specific antenna to the display image data storing memory, for another area, and the display image data storing memory for storing display image data represented by the set display coordinate system.

In this configuration, detected signals received by the respective antennas are input to the detected data generator provided for the respective antennas.

The detected data generator generates detected data represented by a polar coordinate system from a received detected signal and buffers and outputs the detected data in units of one sweep.

The antenna azimuth information output by the antennas are input to the drawing address generator provided for the respective antennas.

The drawing address generator generate and output drawing addresses represented by a rectangular coordinate system corresponding to the image data storing memory using the antenna azimuth information, the distance information from a draw start point to a draw position, and the draw start point position information corresponding to the installed positions of the connected antennas.

The address selector selects the drawing addresses set by the plurality of drawing address generators and outputs the drawing addresses as drawing addresses or read addresses to the plurality of image data storing memories.

Each correlator subjects detected image data represented by a rectangular coordinate system based on detected data from the detected data generator connected thereto to a correlation process on a pixel-by-pixel basis with predetermined timing one time per revolution of the antenna, and stores the correlated data in accordance with addresses set by the address selector. In this case, addresses of all the correlator are set, corresponding to the installed positions of the respective antennas. On the other hand, correlated data processed and stored by each correlator is output in accordance with a drawing address obtained from a predetermined antenna to the display image data selector.

The specific area configurator is connected to a specific antenna, and outputs a specific area indicating detected data from the specific antenna based on azimuth information from the specific antenna, distance information from a draw start point to a draw position, and an area set value to the display image data selector.

Among the correlated data output from the plurality of correlators, the display image data selector selects and outputs correlated data from correlator corresponding to a specific antenna to the display image data storing memory, for a specific area, and selects and outputs correlated data from correlator corresponding to an antenna other than the specific antenna to the display image data storing memory, for another area.

The display image data storing memory stores correlated data thus selected in accordance with a display coordinate system previously set. In this case, coordinate conversion is performed in the drawing address generator, corresponding to each antenna position, so that a positional relationship between correlated data which are obtained from the plurality of antennas and are stored in the display image data storing memory correspond to an antenna installed position relationship. Thus, display image data stored corresponding to the antenna installed position relationship are read out by a display controller and are displayed on a display device.

According to the present invention, an area in which an image obtained from each antenna is displayed is imaged, and the imaged area is referenced to perform drawing or displaying, thereby making it possible to combine and display a plurality of detected images obtained from a plurality of antennas provided at different installed positions in divided areas which do not overlap each other on a single display device.

In addition, a plurality of detected images can be displayed and observed in divided areas on a single display device. Therefore, a radar apparatus and an apparatus similar thereto can be configured in which a troublesome effort to select and observe an appropriate display device among a plurality of display devices, and which can be safely and easily operated.

DESCRIPTION OF THE PREFERRED EMBODIMENTS

A radar apparatus according to a first embodiment of the present invention will be described with reference to the accompanying drawings. Note that, in the following description, it is assumed that there are two radar antennas.

Figure 1:
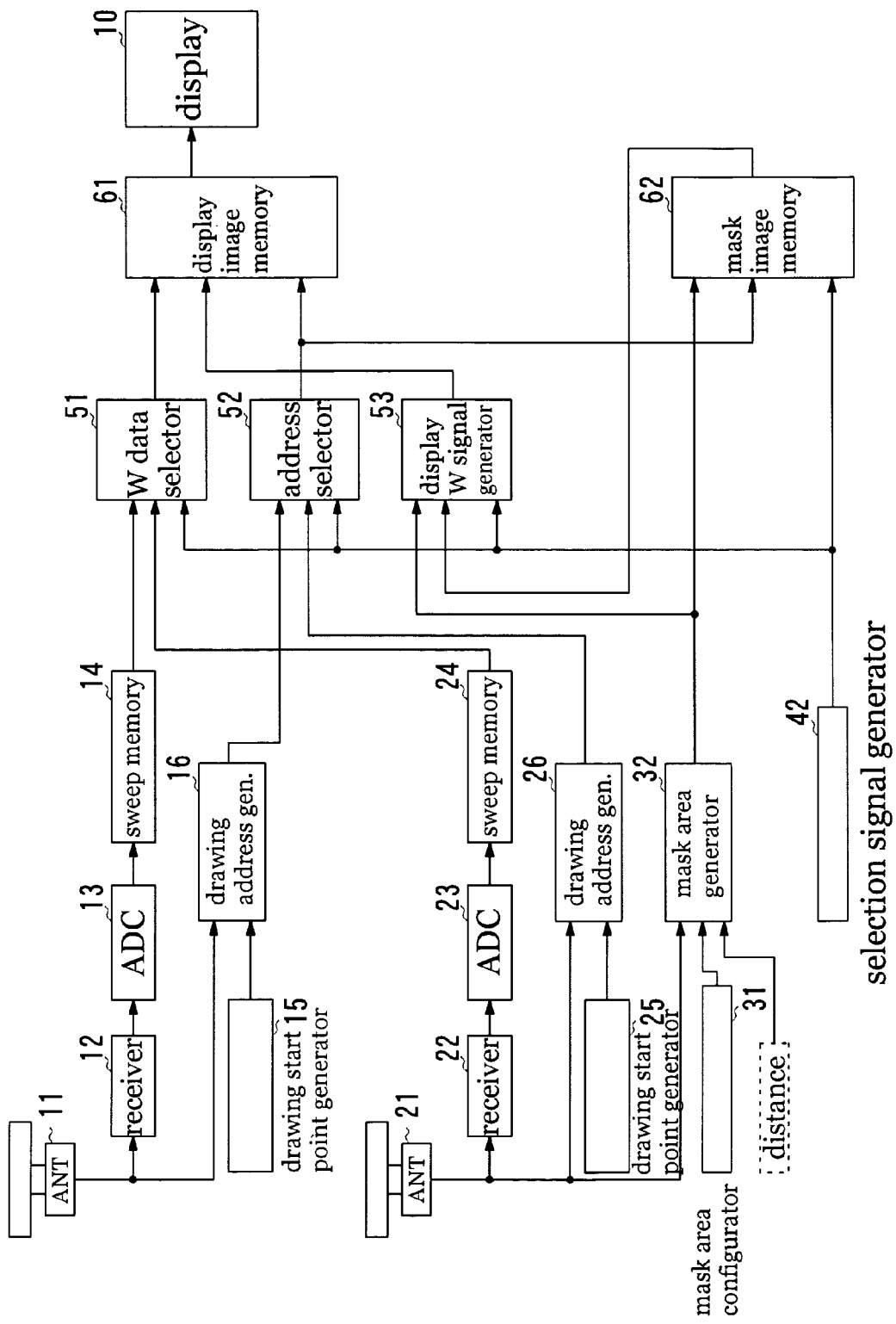
FIG. 1 is a block diagram illustrating a configuration of a radar apparatus according to a first embodiment of the present invention.

FIG. 1 is a block diagram illustrating the radar apparatus of this embodiment.

The radar apparatus of this embodiment includes radar antennas 11 and 21 which are installed at different positions. The radar antennas 11 and 21 each transmit a transmission signal composed of pulsed radio waves to a detection area in predetermined transmission cycles while rotating on a horizontal plane in predetermined cycles. At the same time, the radar antennas 11 and 21 also each receive radio waves reflected from a target in the detection area.

The radar antenna 11 outputs a received signal to a receiver 12 and also outputs antenna azimuth information to a drawing address generator 16. The receiver 12 detects and amplifies the received signal and outputs a first detected signal. An AD converter 13 subjects the first detected signal to AD conversion to generate first detected data represented by a polar coordinate system. A sweep memory 14 stores one sweep of the first detected data, based on an elapsed time (i.e., a distance) from a transmission start time in real time. The sweep memory 14 outputs one sweep of the first detected data thus stored to a W data selector 51 by the time when first detected data obtained by the next transmission is input. The receiver 12, the AD converter 13, and the sweep memory 14 correspond to a "detected data generator" of the present invention.

A drawing start point generator 15 sets a draw start point address (Xs1, Ys1) of the first detected image data which is to be drawn in a display image memory 61, based on a positional relationship between an installed position of the radar antenna 11 and a display screen center of the display image memory 61, and outputs the draw start point address (Xs1, Ys1) to a drawing address generator 16.

The drawing address generator 16 generates addresses which designate pixels in the display image memory 61 arranged in a corresponding rectangular coordinate system, based on an antenna angle θ1 where a predetermined direction (e.g., a ship's head) is used as a reference and a read position r1 of the sweep memory 14 stored based on a distance, directing outward from a sweep start point as a start address. The generated addresses are output to an address selector 52. Specifically, the drawing address generator 16 is composed of hardware which realizes the following expressions.

$$X = Xs1 + r1 \cdot \sin(\theta 1) \quad (1A)$$

$$Y = Ys1 + r1 \cdot \cos(\theta 1) \quad (1B)$$

where X and Y are an address which designates a pixel in the display image memory 61, Xs1 and Ys1 are the above-described draw start point address, r1 is a distance from the sweep start point corresponding to the radar antenna 11, and θ1 is a sweep angle. The drawing start point generator 15 and the drawing address generator 16 correspond to a "drawing address generator" of the present invention.

A radar antenna 21 outputs a received signal to a receiver 22 and also outputs antenna azimuth information to a drawing address generator 26. The receiver 22 detects and amplifies the received signal and outputs a second detected signal. An AD converter 23 subjects the second detected signal to AD conversion to generate second detected data represented by a polar coordinate system. A sweep memory 24 stores one sweep of the second detected data in real time, based on an elapsed time (i.e., a distance) from a transmission start time. The sweep memory 24 outputs one sweep of the second detected data thus obtained to the W data selector 51 by the time when second detected data obtained by the next transmission is input. The receiver 22, the AD converter 23, and the sweep memory 24 correspond to a "detected data generator" of the present invention.

A drawing start point generator 25 sets a draw start point address (Xs2, Ys2) of the second detected image data which is to be drawn in the display image memory 61, based on a positional relationship between an installed position of the radar antenna 21 and the display screen center of the display image memory 61, and outputs the draw start point address (Xs2, Ys2) to the drawing address generator 26.

The drawing address generator 26 generates addresses which designate pixels in the display image memory 61 arranged in a corresponding rectangular coordinate system, based on an antenna angle θ2 where a predetermined direction (e.g., a ship's head) is used as a reference and a read position r2 of the sweep memory 24 stored based on a distance, directing outward from a sweep start point as a start address. The generated addresses are output to the address selector 52. Specifically, the drawing address generator 26 is composed of hardware which realizes the following expressions.

$$X = Xs2 + r2 \cdot \sin(\theta 2) \quad (2A)$$

$$Y = Ys2 + r2 \cdot \cos(\theta 2) \quad (2B)$$

where X and Y are an address which designates a pixel in the display image memory 61, Xs2 and Ys2 are the above-described draw start point address, r2 is a distance from the sweep start point corresponding to the radar antenna 21, and θ2 is a sweep angle. The drawing start point generator 25 and the drawing address generator 26 correspond to a "drawing address generator" of the present invention.

Figure 2:
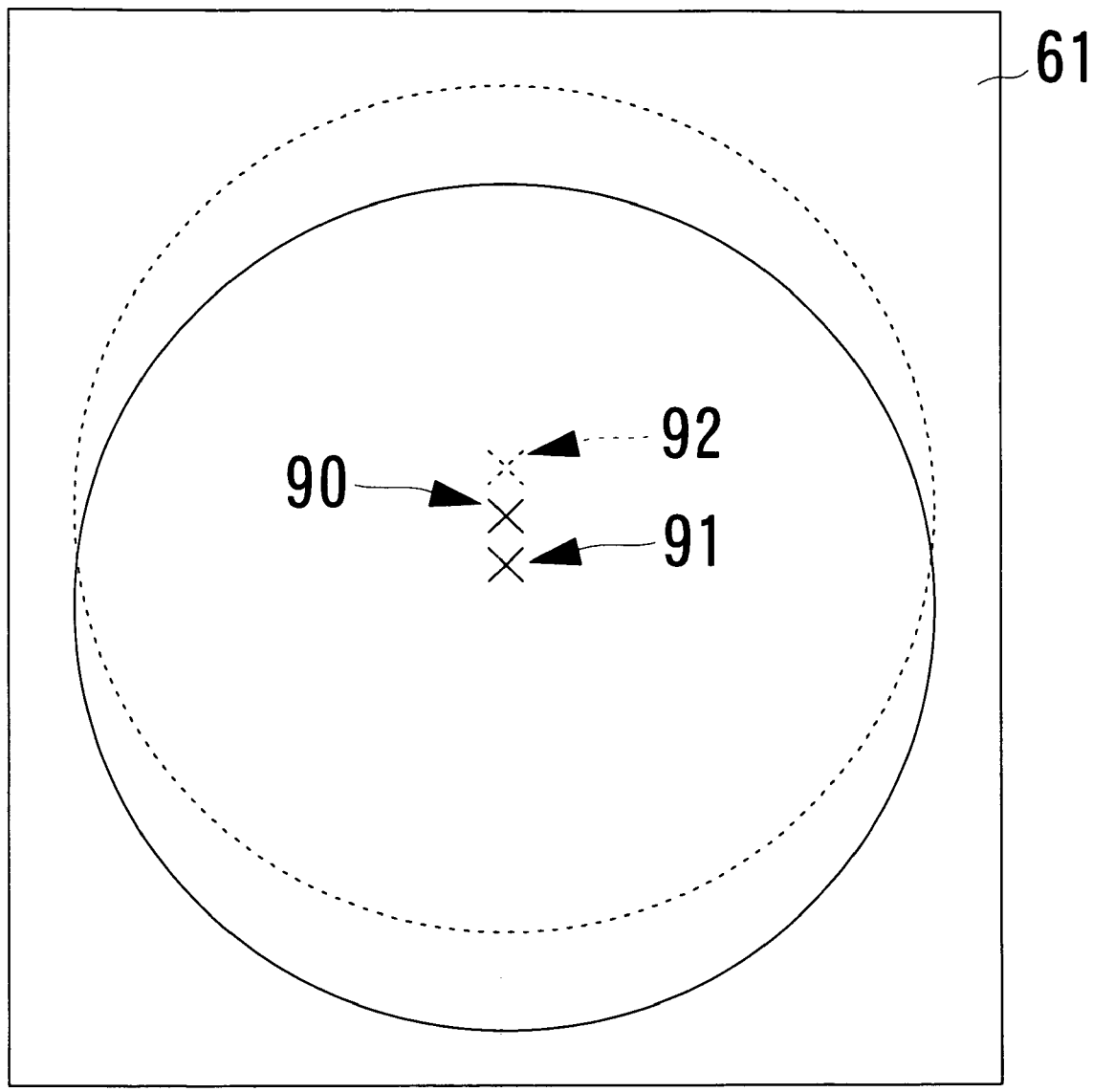
FIG. 2 is a diagram illustrating a relationship between a draw center of a display image memory 61 and sweep centers of radar antennas 11 and 21.

FIG. 2 illustrates an exemplary relationship between the display screen center of the display image memory 61 and the sweep centers (start points) of the radar antennas 11 and 21. In FIG. 2, 90 indicates the display screen center, 91 indicates the sweep center (start point) of the radar antenna 11, and 92 indicates the sweep center (start point) of the radar antenna 21.

A mask area configurator 31 outputs parameters for setting a predetermined area in the display image memory 61 in which the second detected image data is to be written (azimuth direction mask setting data and distance direction mask setting data) to a mask area generator 32. Examples of this area setting are illustrated in FIGS. 3A to 3C.

Figure 3:
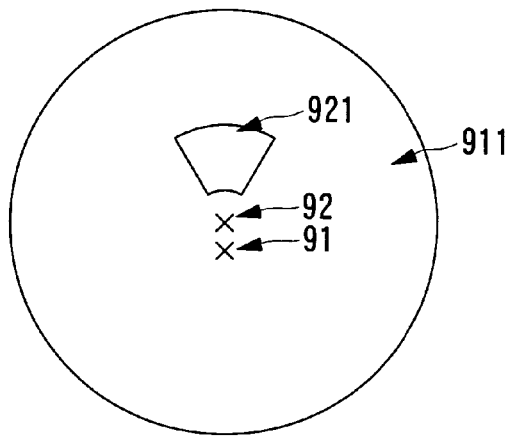
FIGS. 3A to 3C are diagrams illustrating an exemplary setting of a display image, i.e., divided areas corresponding to respective radar antennas of a display image memory 61.
Figure 3:
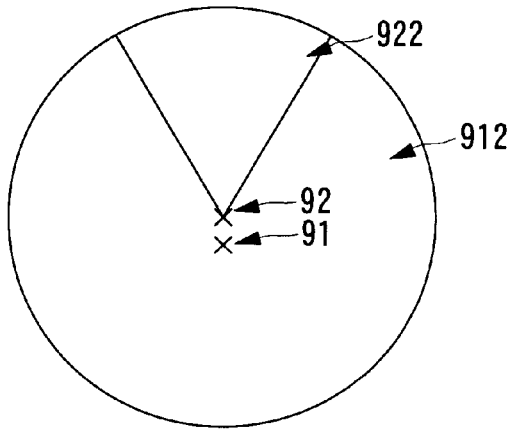
Figure 3:
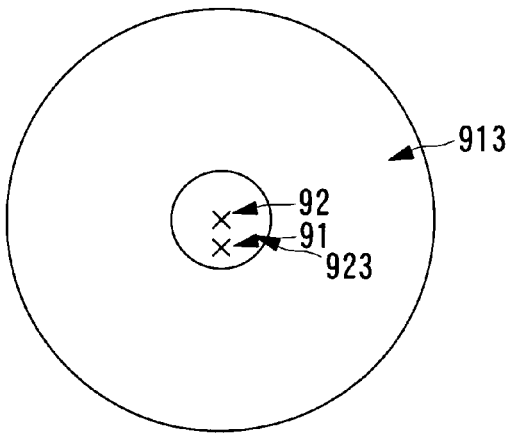

FIGS. 3A to 3C are diagrams illustrating display image settings, i.e., area divisions for each radar antenna in the display image memory 61. In FIGS. 3A to 3C, 911, 912, and 913 each indicate an area in which detected image data obtained by the radar antenna 11 is to be written, and 921, 922, and 923 each indicate an area in which detected image data obtained by the radar antenna 21 is to be written. Also in FIGS. 3A to 3C, 91 indicates the sweep center (start point) of the radar antenna 11 and 92 indicates the sweep center (start point) of the radar antenna 21. FIG. 3A indicates that the area 921 is set as an area which is located in an upper portion of the display screen and is enclosed with two distances and two azimuths which can be set. FIG. 3B indicates that the area 922 is set as an area which is located in an upper portion of the display screen and is enclosed with two azimuths which can be set. FIG. 3C indicates that the area 923 is set as an area which is located within a predetermined distance from substantially the center of the display screen as a center. The mask area configurator 31 sets these areas of FIGS. 3A to 3C using the azimuth direction mask setting data and the distance direction mask setting data.

The mask area generator 32 receives the azimuth information from the radar antenna 21, the draw start point position information corresponding to the installed position of the radar antenna 21, the azimuth direction mask setting data and the distance direction mask setting data from the mask area configurator 31, and data about a distance from the a sweep start point corresponding to a read address in the sweep memory 24. The mask area generator 32 uses these pieces of data to output data having a meaning (e.g., "1") with respect to an area corresponding to a mask area and meaningless data (e.g., "0") with respect to an area not corresponding to a set area, in synchronization with detected data generating timing of each section of a system connected to the radar antenna 21. The area of "1" is an area in which the second detected data obtained by the radar antenna 21 is to be drawn, and the area of "0" is an area in which the first detected data obtained by the radar antenna 11 is to be drawn. These pieces of output data are output to a mask image memory 62 and a display W signal generator 53.

A selection signal generator 42 generates a selection signal which is a timing signal for alternately performing drawing of the first detected data and drawing of the second detected data with respect to the display image memory 61 in a time-division manner. The selection signal is set, for example, as follows: when the selection signal is "0", the drawing of the first detected data is executed; and when the selection signal is "1", the drawing of the second detected data is executed.

The W data selector 51 selects the first detected data input from the sweep memory 14 when the selection signal input from the selection signal generator 42 is "0", and selects the second detected image data input from the sweep memory 24 when the selection signal is "1", and outputs the selected data to the display image memory 61.

The address selector 52 selects an address set by the drawing address generator 16 when the selection signal input from the selection signal generator 42 is "0", and selects an address set by the drawing address generator 26 when the selection signal is "1", and outputs the selected address to the display image memory 61 and the mask image memory 62.

The display W signal generator 53 generates a write signal for the display image memory 61, based on the selection signal from the selection signal generator 42, the mask data output from the mask area generator 32, and the mask data read out from the mask image memory 62. Specifically, the display W signal generator 53 writes the first detected data from the sweep memory 14 to the display image memory 61 when the selection signal is "0" and the mask data read out from the mask image memory 62 is "0". When the selection signal is "1" and the signal output from the mask area generator 32 is "1", the display W signal generator 53 writes the second detected signal from the sweep memory 24 into the display image memory 61. The W data selector 51, the address selector 52, and the display W signal generator 53 correspond to a "detected data selector" of the present invention.

The mask image memory 62 has the same number of addresses as that of the display image memory 61 described below, and has one-bit data capacity with respect to each address. The mask image memory 62 stores data "0" or "1" output from the mask area generator 32 as mask data. When the selection signal of the selection signal generator 42 is "0", contents of the mask image memory 62 are read out and output to the display W signal generator 53. When the selection signal of the selection signal generator 42 is "1", the mask data from the mask area generator 32 is written into the mask image memory 62. Here, a portion composed of the mask image memory 62, the mask area configurator 31, and the mask area generator 32 corresponds to a "specific area configurator" of the present invention.

The display image memory 61 has a capacity which can store detected image data corresponding to one revolution of an antenna. In accordance with an address from the address selector 52, the detected data (the first detected data or the second detected data) output from the W data selector 51 is written as detected image data corresponding to the address into the display image memory 61. In this case, the detected image data is written into the display image memory 61 when a write signal from the display W signal generator 53 is "1". Specifically, when the output of the selection signal generator 42 is "0" and the mask data read out from the mask image memory 62 is "0", the first detected data is written as detected image data into the display image memory 61 at an address set by the drawing address generator 16. When the output of the selection signal generator 42 is "1" and the mask data of the mask area generator 32 is "1", the second detected data is written as detected image data into the display image memory 61 at an address set by the drawing address generator 26.

The display image memory 61 is read with high speed in synchronization with raster scanning of a display device 10 performed by a display controller (not shown). The detected image data thus read out is assigned with an intensity or color corresponding thereto, and is output as display image data to the display device 10. The display device 10 displays an image on a screen based on the received display image data.

The display image memory 61 corresponds to an "image data storing memory" of the present invention.

With such a configuration, the detected image data obtained from the two radar antennas 11 and 21 installed at different positions can be combined and displayed in divided areas which do not overlap each other on a single display device.

Particularly, a mask image (mask data) indicating a draw permitted area for one radar antenna and a draw forbidden area for the other radar antenna can be used and referenced to perform drawing easily and correctly.

This can be achieved for the following reason.

Assuming that detected image data obtained by a plurality of radar antennas are combined and displayed in divided areas which do not overlap each other on a single display device, when each piece of detected data is written into an image memory, it is necessary to determine whether or not the area is an area into which the detected data is to be written. As compared to the case where the sweep start points on the image memory have the same coordinates, it is more difficult when the sweep start points on the image memory have different coordinates since the antenna installed positions are different from each other.

Conventionally, before detected image data is written, it needs to be confirmed that the corresponding pixel (address) is not present within a write area for other radar antennas, by calculation based on the positions of the other radar antennas, for example.

As in this embodiment, by setting a drawing area for detected image data as a mask area indicating that drawing of other detected data is forbidden, and imaging the mask area, it is possible to easily determine whether or not the drawing area is a write area, by referencing the mask image.

As a result, by using the configuration and the processing method of this embodiment, detected image data obtained from a plurality of radar antennas can be easily and reliably combined and displayed in divided areas which do not overlap each other on a single display device. This effect is also applied to each embodiment described below.

Next, a radar apparatus according to a second embodiment of the present invention will be described with reference to FIG. 4.

Figure 4:
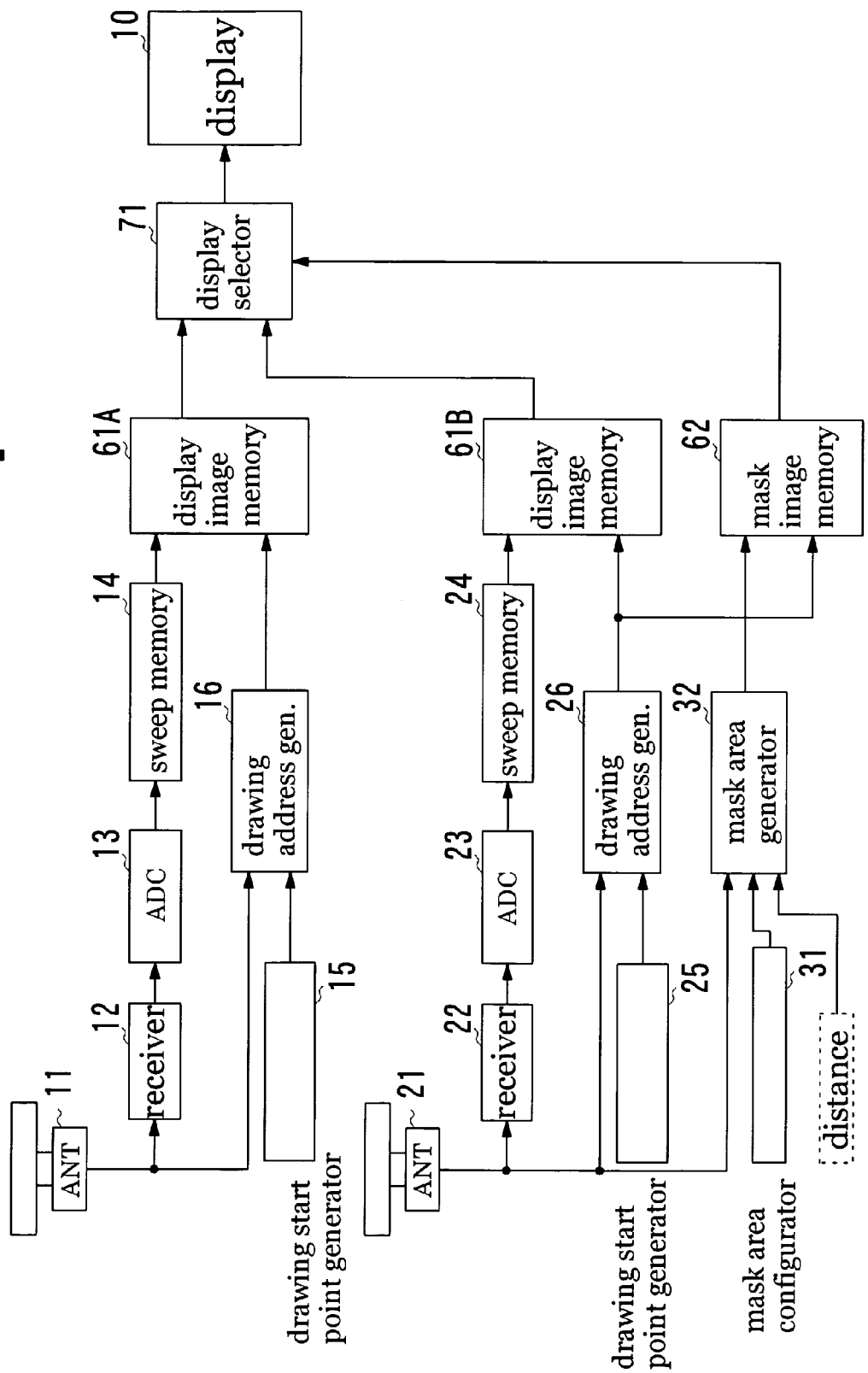
FIG. 4 is a block diagram illustrating a configuration of a radar apparatus according to a second embodiment of the present invention.

FIG. 4 is a block diagram illustrating a configuration of the radar apparatus of this embodiment.

The radar apparatus of this embodiment has partially the same structure as that of the radar apparatus of the first embodiment. The same parts (blocks) as those of the radar apparatus of the first embodiment are designated with the same symbols and will not be described.

The radar apparatus of FIG. 4 is different from the radar apparatus of FIG. 1 in that the selection signal generator 42, the W data selector 51, the address selector 52, and the display W signal generator 53 are removed, and two display image memories 61A and 61B and a display selector 71 are added.

The display image memory 61A has a capacity which can store detected image data corresponding to one revolution of an antenna. The first detected data from the sweep memory 14 is written as first detected image data into the display image memory 61A in accordance with an address set by the drawing address generator 16.

The display image memory 61B has a capacity which can store detected image data corresponding to one revolution of an antenna. The second detected data from the sweep memory 24 is written as second detected image data into the display image memory 61B in accordance with an address set by the drawing address generator 26.

The mask image memory 62 in which mask data designating a display permitted area and a display forbidden area for each piece of detected image data is to be written, is subjected to drawing with the same timing as that of drawing of the display image memory 61B.

In synchronization with raster scanning of the display device 10 performed by a display controller (not shown), the first detected image data, the second detected image data, and the mask data are read out from the display image memories 61A and 61B and the mask image memory 62, respectively, and are input to the display selector 71.

The display selector 71 selects and outputs the received first detected image data or second detected image data to the display device 10 in accordance with the mask data output from the mask image memory 62. Specifically, the display selector 71 outputs the first detected image data from the display image memory 61A when the mask data is "0", and outputs the second detected image data from the display image memory 61B when the mask data is "1". The display selector 71 corresponds to an "output data selector" of the present invention.

A drawing address in the display image memory 61A (set by the drawing address generator 16) and a drawing address in the display image memory 61B and the mask image memory 62 (set by the drawing address generator 26) are created using the same reference. These drawing addresses correspond to a relationship between the antenna installed positions, and therefore, are read using a common display read address and are input to the display device.

With such a configuration, the first detected image data and the second detected image data obtained from the two radar antennas 11 and 21 installed at different positions can be combined and displayed in divided areas which do not overlap each other on a single display device. Particularly, a mask image indicating a draw permitted area for one radar antenna and a draw forbidden area for the other radar antenna is used to select a display output, thereby making it possible to easily and correctly combine and display detected image data obtained from two radar antennas installed at separate positions on a single display device.

Next, a radar apparatus according to a third embodiment of the present invention will be described with reference to the drawings.

Figure 5:
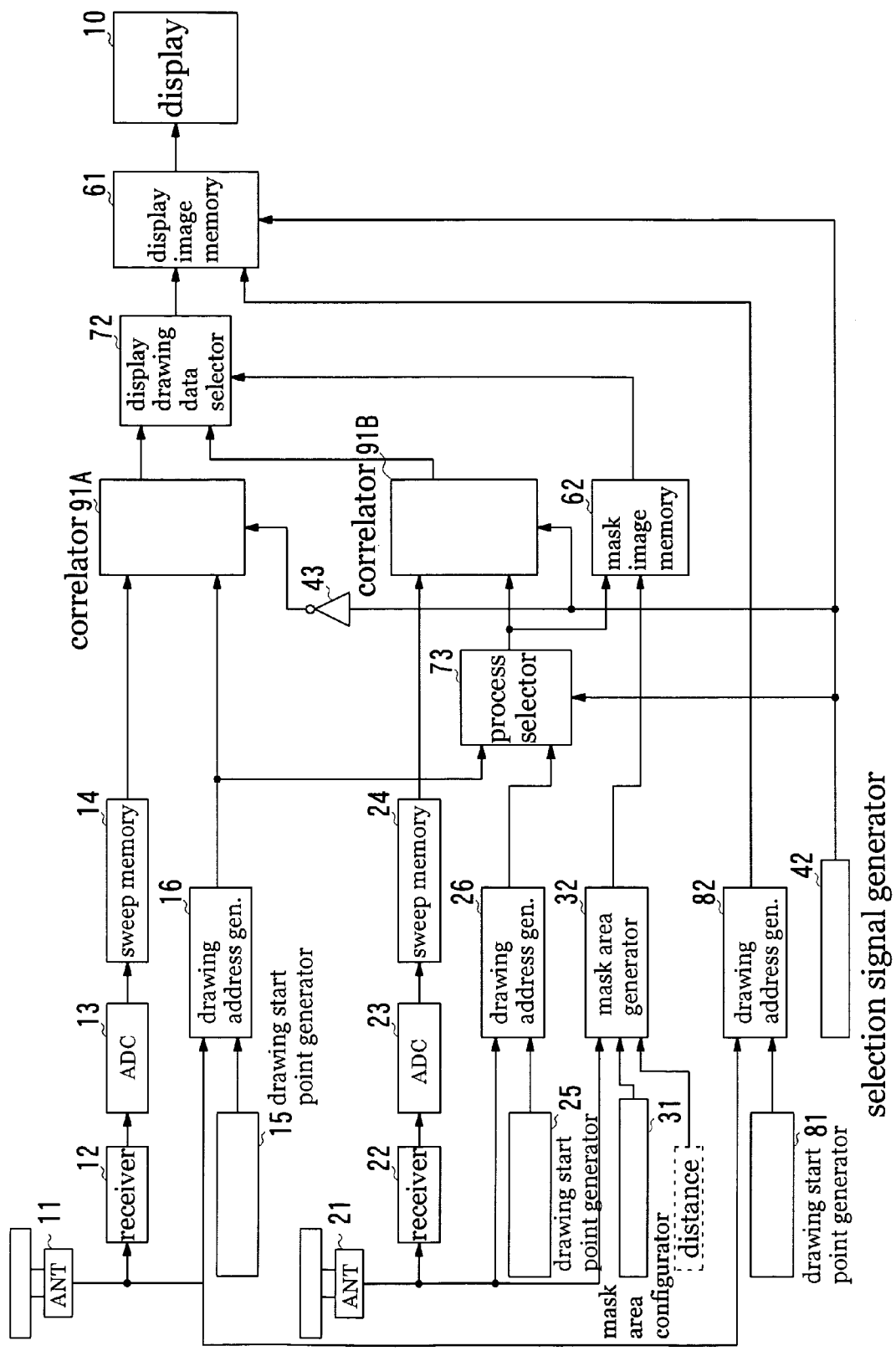
FIG. 5 is a block diagram illustrating a configuration of a radar apparatus according to a third embodiment of the present invention.

FIG. 5 is a block diagram illustrating a configuration of the radar apparatus of this embodiment.

The radar apparatus of this embodiment has partially the same structure as that of the radar apparatus of the first embodiment. The same parts (blocks) as those of the radar apparatus of the first embodiment are designated with the same symbols and will not be described.

The radar apparatus of FIG. 5 is different from the radar apparatus of FIG. 1 in that the W data selector 51, the address selector 52, and the display W signal generator 53 are removed, and two correlators 91A and 91B, a inverter 43, a display drawing data selector 72, a process selector 73, a drawing start point generator 81, and a drawing address generator 82 are added.

In the above-described first and second embodiments, a display image memory also serves as a correlation process memory, thereby making it possible to perform a scan correlation process. In this embodiment and a fourth embodiment described below, a dedicated scan correlator is provided to draw a process result of the scan correlator into a display image memory. By separating the correlator from the display image memory in this manner, a display image can be displayed in any display mode while processing the correlator using a true motion coordinate system. In the following description, details of the scan correlation process will not be described.

Also in this embodiment, when a selection signal output by the selection signal generator 42 is "0", the display image memory is updated in accordance with the revolution of the radar antenna 11, and when the selection signal is "1", mask data is generated in accordance with the revolution of the radar antenna 21.

When the selection signal received from the selection signal generator 42 is "0", the process selector 73 selects an address set by the drawing address generator 16 and outputs the selected address as a read address to the correlator 91B and the mask image memory 62. On the other hand, when the selection signal received from the selection signal generator 42 is "1", the process selector 73 selects an address set by the drawing address generator 26 and outputs the selected address as a write address to the correlator 91B and the mask image memory 62. The process selector 73 corresponds to an "address selector" of the present invention.

The inverter 43 reverses a received selection signal and outputs the resultant signal as a selector signal to the correlator 91A.

Figure 6:
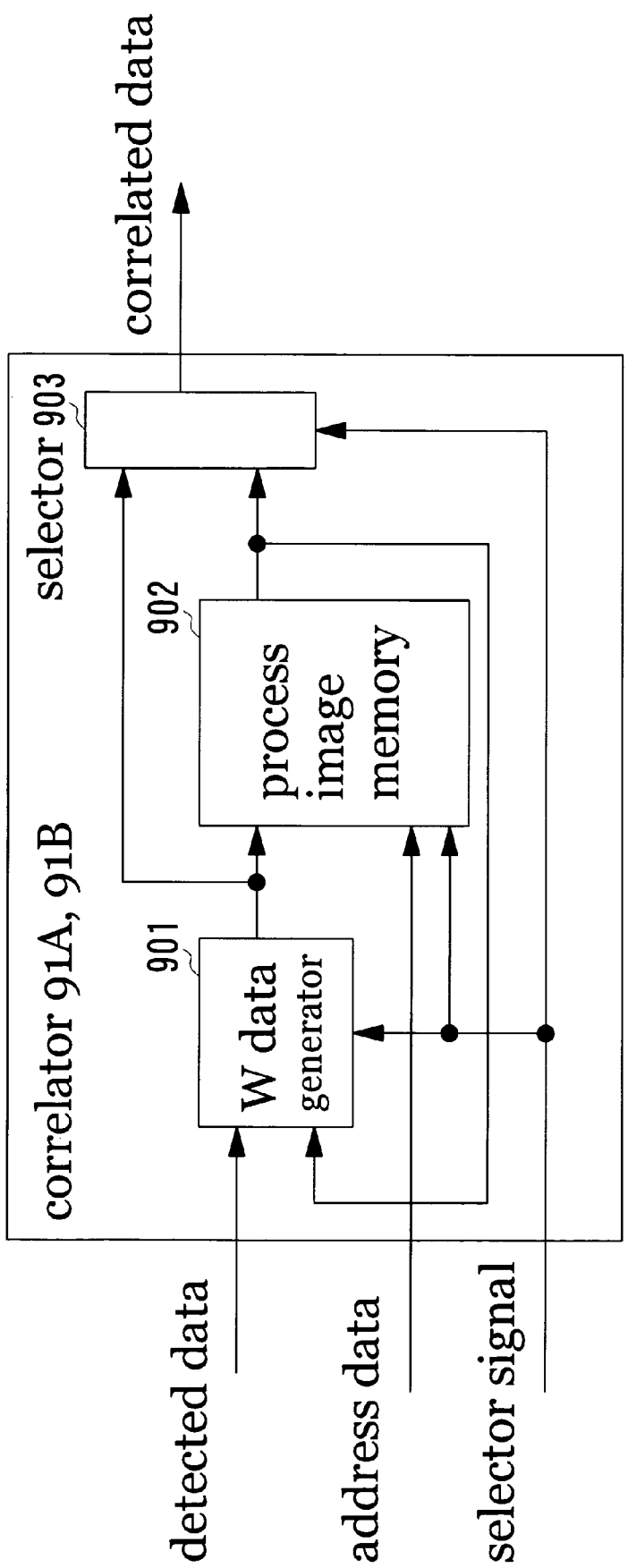
FIG. 6 is a block diagram illustrating a schematic structure of correlators 91A and 91B of FIG. 5.

The correlators 91A and 91B each have a structure illustrated in FIG. 6. FIG. 6 is a block diagram illustrating a schematic structure of the correlators 91A and 91B. The correlators 91A and 91B each include a W data generator 901, a process image memory 902, and a selector 903.

When the selection signal is "0" (i.e., the selector signal is "1"), the correlator 91A performs a scan correlation process in the W data generator 901 using correlated data until one revolution before which is read out from the process image memory 902 and new detected data received from the sweep memory 14 in accordance with the write address received from the drawing address generator 16. Thereafter, the correlator 91A writes new correlated data into the process image memory 902, selects the new correlated data using the selector 903, and outputs the new correlated data as first correlated data to the display drawing data selector 72.

At the same time, when the selection signal is "0" (i.e., the selector signal of the correlator 91B is "0"), the correlator 91B does not update the process image memory 902, reads correlated data from the process image memory 902 in accordance with the address received from the drawing address generator 16 selected by the process selector 73, selects the correlated data using the selector 903, and outputs the correlated data as second correlated data to the display drawing data selector 72. Also at the same time, the address provided by the drawing address generator 16 selected by the process selector 73 is input to the mask image memory 62, and mask data is read out from the mask image memory 62.

On the other hand, when the selection signal is "1" (i.e., the selector signal of the correlator 91B is "1"), the correlator 91B uses correlated data until one revolution before which is read out from the process image memory 902 and new detected data input from the sweep memory 24 in accordance with the write address received from the drawing address generator 26 to perform a scan correlation process using the W data generator 901. Thereafter, the correlator 91B writes new correlated data into the process image memory 902. Also at the same time, the write address provided by the drawing address generator 26 selected by the process selector 73 is also input to the mask image memory 62, and mask data generated by the mask area generator 32 is written into the mask image memory 62.

When the selection signal is "0", the display image data selector 72 selects and outputs the received first correlated data and second correlated data to the display image memory 61 in accordance with the mask data read out from the mask image memory 62. Specifically, the display image data selector 72 outputs the first correlated data from the correlator 91A when the mask data is "0", and outputs the second correlated data from the correlator 91B when the mask data is "1". The display image data selector 72 corresponds to a "display image data selector" of the present invention.

The drawing start point generator 81 sets a draw start point address (Xds, Yds) of display image data which is to be drawn into the display image memory 61, based a positional relationship between the installed position of the radar antenna 11 and the draw start point of the display image memory 61, and outputs the draw start point address (Xds, Yds) to a draw start point address generator 82.

The drawing address generator 82 generates addresses which designate pixels in the display image memory 61 arranged in a corresponding rectangular coordinate system, based on an antenna angle θ1 where a predetermined direction (e.g., a ship's head) is used as a reference, and a read position r1 in the sweep memory 14 stored based on a distance, directing outward from a sweep start point as a start address. The generated addresses are output to the display image memory. Specifically, the drawing address generator 82 is composed of hardware which realizes the following expressions.

$$X = Xds + r1 \cdot \sin(\theta 1) \quad (3A)$$

$$Y = Yds + r1 \cdot \cos(\theta 1) \quad (3B)$$

where X and Y are an address which designates a pixel in the display image memory 61, Xds and Yds are the above-described draw start point address, r1 is a distance from the center of sweep corresponding to the radar antenna 11, and θ1 is a sweep angle.

When the scan correlation process is executed, a sweep angle which is input to the correlator is typically an angle which is obtained by adding compass data to an antenna angle where the north is a reference. Also, a sweep angle which is input to the display image memory is changed between an antenna azimuth only (head-up display) and an angle obtained by adding the antenna azimuth with compass data (north-up display), depending on a selected display mode (i.e., the purpose of use). Here, it is assumed that the sweep angle in the display image memory is the same as an angle (θ) which is input to the drawing address generator 16.

The display image memory 61 has a capacity which can store detected image data corresponding to one revolution of an antenna. When the selection signal is "0", the display image memory 61 writes the correlated data (the first correlated data or the second correlated data) output from the display image data selector 72 as display image data in accordance with the address set by the drawing address generator 82. Thereafter, the display image data is read out from the display image memory 61 and is output to the display device 10 in synchronization with raster scanning of the display device 10 performed by a display controller (not shown). Thus, according to the configuration of this embodiment, the image memory is updated by sweeping in accordance with the revolution of the radar antenna 11 without setting a mask area. Specifically, the radar antenna 11 which generates a sweep for updating the image memory serves as a master, and one of two pieces of correlated data is selected in accordance with mask data and is drawn into the display image memory. With this operation, display image data illustrated in FIG. 7 is obtained.

Figure 7:
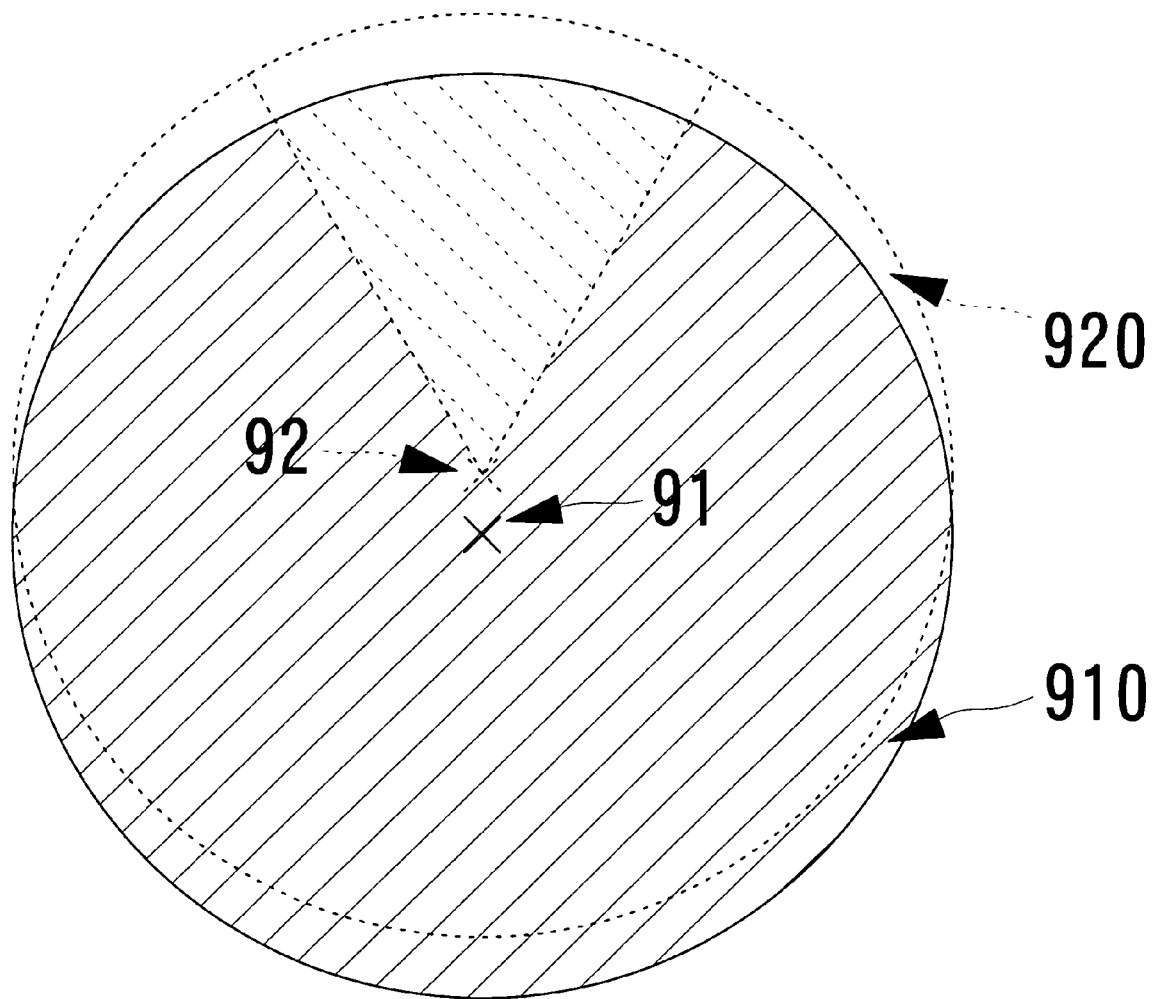
FIG. 7 is a diagram illustrating an area relationship between first correlated data 910 and second correlated data 920.

FIG. 7 is a diagram illustrating an area relationship between first correlated data 910 and second correlated data 920. In FIG. 7, 910 indicates first correlated data obtained from the radar antenna 11 serving as a master, and 920 indicates second correlated data obtained from the radar antenna 21 serving as a slave. Also in FIG. 7, 91 indicates the start point of the first correlated data, and 92 indicates the start point of the second correlated data.

With the configuration of this embodiment, the display image memory 61 is updated by sweeping performed in synchronization with the radar antenna 11 serving as a master, so that the first correlated data 910 is written into a non-mask area (hatched with solid lines), and the second correlated data 920 is written into a mask area (hatched with dotted lines).

With such a configuration, first correlated data and second correlated data obtained from two radar antennas installed at different positions can be combined and displayed in divided areas which do not overlap each other on a single display device. Particularly, mask data indicating a draw permitted area for one radar antenna and a draw forbidden area for the other radar antenna is used to select a display output, thereby making it possible to easily and correctly combine and display two pieces of correlated data on a single display device.

Next, a radar apparatus according to a fourth embodiment of the present invention will be described with reference to the drawings.

Figure 8:
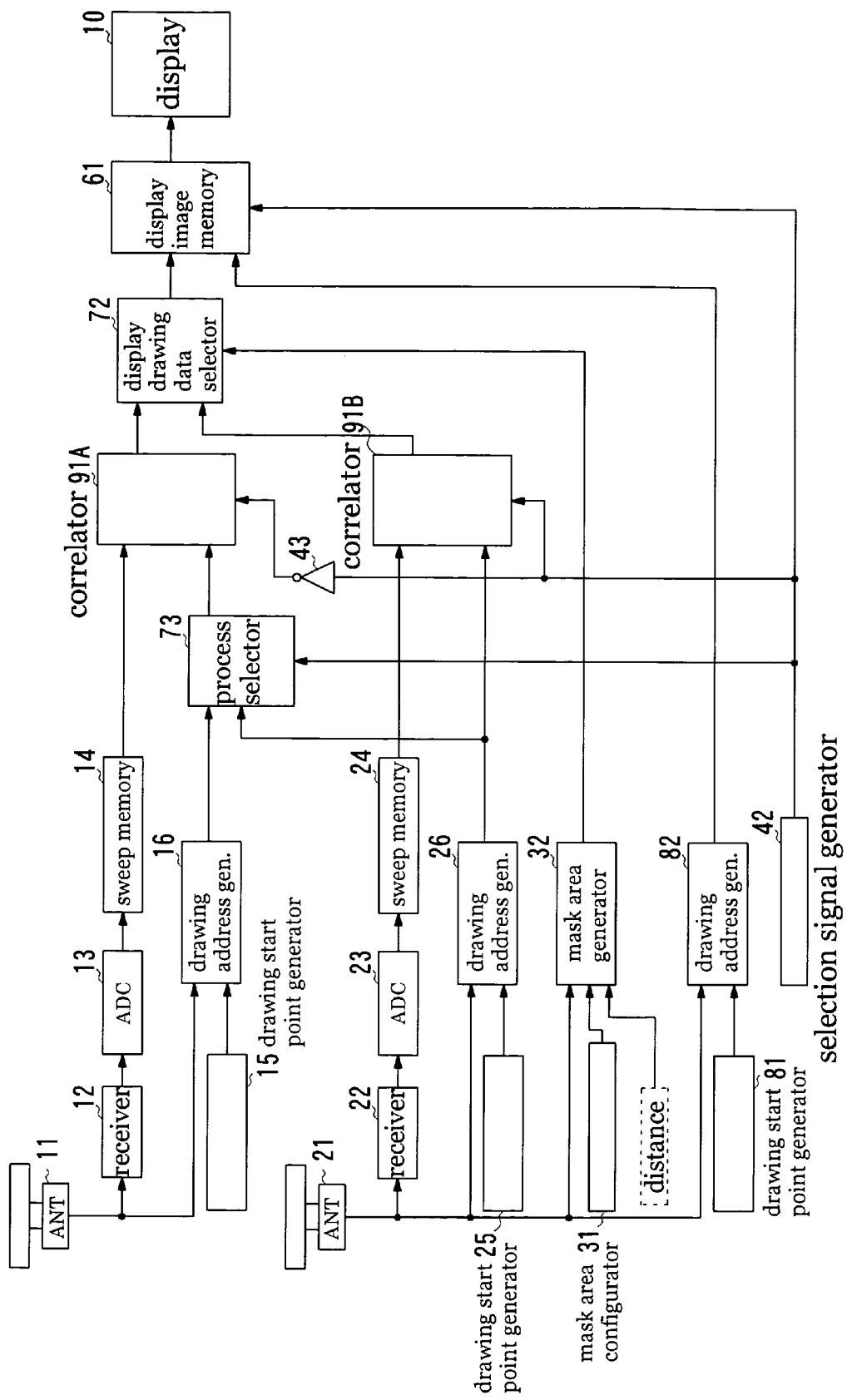
FIG. 8 is a block diagram illustrating a configuration of a radar apparatus according to a fourth embodiment of the present invention.

FIG. 8 is a block diagram illustrating a configuration of the radar apparatus of this embodiment.

The radar apparatus of this embodiment has partially the same structure as that of the radar apparatus of the first embodiment. The same parts (blocks) as those of the radar apparatus of the first embodiment are designated with the same symbols and will not be described.

The radar apparatus of FIG. 8 is different from the radar apparatus of FIG. 1 in that the W data selector 51, the address selector 52, the display W signal generator 53, and the mask image memory 62 are removed, and two correlators 91A and 91B, a inverter 43, a display drawing data selector 72, a process selector 73, a drawing start point generator 81, and a drawing address generator 82 are added. In addition, the radar apparatus of FIG. 8 is different from the radar apparatus of FIG. 5 in that the mask image memory 62 is removed. In this embodiment, when the selection signal output from the selection signal generator 42 is "1", a display image memory is updated and mask data is generated in accordance with the revolution of the radar antenna 21.

When the selection signal received from the selection signal generator 42 is "0", the process selector 73 selects an address set by the drawing address generator 16 and outputs the selected address as a write address to the correlator 91A. On the other hand, when the selection signal received from the selection signal generator 42 is "1", the process selector 73 selects an address set by the drawing address generator 26 and outputs the selected address as a read address to the correlator 91A. The process selector 73 corresponds to an "address selector" of the present invention.

The inverter 43 reverses the received selection signal and outputs the result as a selector signal to the correlator 91A.

The correlators 91A and 91B each have the above-described configuration of FIG. 6. FIG. 6 is a block diagram illustrating the schematic configuration of the correlators 91A and 91B. The correlators 91A and 91B each include the W data generator 901, the process image memory 902, and the selector 903.

When the selection signal is "0" (i.e., the selector signal is "1"), the correlator 91A performs a scan correlation process in the W data generator 901 using correlated data until one revolution before which is read out from the process image memory 902 and new detected data received from the sweep memory 14 in accordance with a write address received from the drawing address generator 16 selected by the process selector 73. Thereafter, the correlator 91A writes new correlated data into the process image memory 902 as first correlated data.

On the other hand, when the selection signal is "0" (i.e., the selector signal of the correlator 91A is "0"), the correlator 91A does not update the process image memory 902, reads correlated data from the process image memory 902 in accordance with the address received from the drawing address generator 26 selected by the process selector 73, selects the correlated data using the selector 903, and outputs the correlated data as first correlated data to the display drawing data selector 72.

At the same time, when the selection signal is "1" (i.e., the selector signal of the correlator 91B is "1"), the correlator 91B uses correlated data until one revolution before which is read out from the process image memory 902 and new detected data input from the sweep memory 24 in accordance with a write address received from the drawing address generator 26 to perform a scan correlation process using the W data generator 901. Thereafter, the correlator 91B writes new correlated data into the process image memory 902, selects the new correlated data using the selector 903, and outputs the new correlated data as second correlated data to the display drawing data selector 72.

At the same time, when the selection signal is "1", the display image data selector 72 selects and outputs the received first correlated data and second correlated data to the display image memory 61 in accordance with mask data read out from the mask area generator 32. Specifically, the display image data selector 72 outputs the first correlated data from the correlator 91A when the mask data is "0", and outputs the second correlated data from the correlator 91B when the mask data is "1". The display image data selector 72 corresponds to a "display image data selector" of the present invention.

The drawing start point generator 81 sets a draw start point address (Xds, Yds) of display image data which is to be drawn into the display image memory 61, based a positional relationship between the installed position of the radar antenna 21 and the draw start point of the display image memory 61, and outputs the draw start point address (Xds, Yds) to the draw start point address generator 82.

The drawing address generator 82 generates addresses which designate pixels in the display image memory 61 arranged in a corresponding rectangular coordinate system, based on an antenna angle θ2 where a predetermined direction (e.g., a ship's head) is used as a reference, and a read position r2 in the sweep memory 14 stored based on a distance, directing outward from a sweep start point as a start address. The generated addresses are output to the display image memory. Specifically, the drawing address generator 82 is composed of hardware which realizes the following expressions.

$$X = Xds + r2 - \sin(\theta 2) \quad (4A)$$

$$Y = Yds + r2 - \cos(\theta 2) \quad (4B)$$

where X and Y are an address which designates a pixel in the display image memory 61, Xds and Yds are the above-described draw start point address, r2 is a distance from the center of sweep corresponding to the radar antenna 21, and θ2 is a sweep angle.

Although a sweep angle which is input to the correlator is actually an angle which is obtained by adding compass data to an antenna angle where the north is a reference, a sweep angle which is input to the display image memory is changed between an antenna azimuth only (head-up display), an angle obtained by adding the antenna azimuth with compass data (north-up display), and the like, depending on a selected display mode (i.e., the purpose of use). Here, it is assumed that the sweep angle in the display image memory is the same as an angle (θ2) which is input to the drawing address generator 26.

The display image memory 61 has a capacity which can store detected image data corresponding to one revolution of an antenna. When the selection signal is "1", the display image memory 61 writes the correlated data (the first correlated data or the second correlated data) output from the display image data selector 72 as display image data in accordance with the address set by the drawing address generator 82. Thereafter, the display image data is read out from the display image memory 61 and is output to the display device 10 in synchronization with raster scanning of the display device 10 performed by a display controller (not shown). Thus, according to the configuration of this embodiment, the display image data (correlated data) generating system for the radar antenna 11 for which a mask area is not set serves as a slave, and the display image data (correlated data) generating system for the radar antenna 21 for which a mask area is set serves as a master. With this operation, display image data illustrated in FIG. 9 is obtained.

Figure 9:
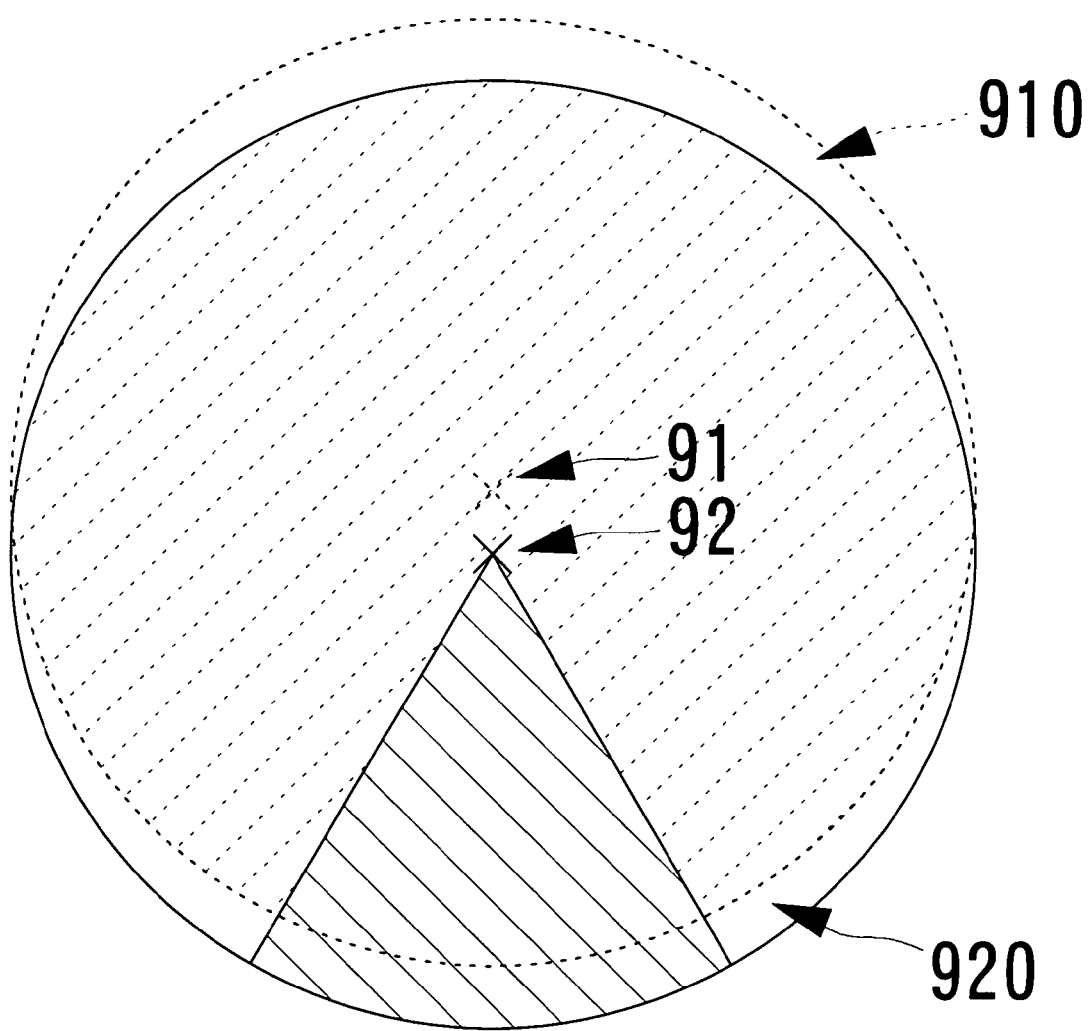
FIG. 9 is a diagram illustrating an area relationship between first correlated data 910 and second correlated data 920.

FIG. 9 is a diagram illustrating an area relationship between first correlated data 910 and second correlated data 920. In FIG. 9, 910 indicates first correlated data obtained from the radar antenna 11 serving as a slave, and 920 indicates second correlated data obtained from the radar antenna 21 serving as a master. Also in FIG. 9, 91 indicates the start point of the first correlated data, and 92 indicates the start point of the second correlated data.

With the configuration of this embodiment, the display image memory 61 is updated by sweeping performed in synchronization with the radar antenna 21 serving as a master, so that the second correlated data 920 is written into a mask area (hatched with solid lines), and the first correlated data 910 is written into a non-mask area (hatched with dotted lines).

With such a configuration, first correlated data and second correlated data obtained from two radar antennas installed at different positions can be combined and displayed in divided areas which do not overlap each other on a single display device. Particularly, mask data indicating a draw permitted area for one radar antenna and a draw forbidden area for the other radar antenna is used to select data to be drawn into a display image memory, thereby making it possible to easily and correctly combine and display two pieces of scan correlated data on a single display device.

Note that, when two pieces of correlated data based on detected data from two radar antennas are combined and displayed as in the configuration of this embodiment, and a radar antenna which generates a sweep (detected data) for updating a display image memory and a radar antenna which generates a mask area are the same, a mask image memory can be removed.

Note that, in the above description, synchronization of the radar antenna directions is not particularly described. Since radar video (image) is updated in accordance with the revolution of a radar antenna, when two radar antennas are rotated asynchronously, a reflected signal from the same target is received by the radar antennas with different timings. Assuming that a difference between update times is n seconds, a target moving relative to the antenna installed positions is displayed at positions which are different from each other by n seconds.

Specifically, when the antennas each have a rotational speed of 24 rpm, the maximum update time difference is 2.5 seconds. Therefore, the video of a moving target present on an area border is displayed at positions which are different from each other by a maximum of 2.5 seconds between both sides of the area border. In this case, regarding the first and second embodiments, the difference between the displayed positions can be reduced by substantially synchronizing the rotations of the radar antennas to reduce the update time difference. Regarding the third and fourth embodiments, by substantially synchronizing the rotations of the radar antennas, and in addition, advancing the rotation direction of the radar antenna other than a master by a small amount than the rotation direction of the radar antenna serving as the master, the display position difference can be reduced.

By applying the configuration of each embodiment to a configuration which employs a conventional switch module, detected video through a plurality of antennas can be displayed in a plurality of divided areas on a single display device, in addition to a conventional switching module function.

In each of the above-described embodiments, only one mask area is provided for each antenna. Alternatively, a plurality of mask areas may be provided for each antenna.

In each of the above-described embodiments, the number of antennas is two. Alternatively, three or more antennas may be used. For example, when N antennas are used, a mask image is formed for each of N-1 antennas. Thereby, a plurality of pieces of detected image data from the N antennas can be combined and displayed in divided areas which do not overlap each other.

In each of the above-described embodiments, a mask image is written in synchronization with writing of detected image data. Alternatively, only a mask image may be previously written. In addition, the shape of a mask image is not limited to the above-described example, i.e., a mask image can be set in any shape.

Next, a target detecting system according to a fifth embodiment of the present invention will be described with reference to FIGS. 10 and 11A and 11B. The fifth embodiment indicates an exemplary application of the radar apparatuses of the first to fourth embodiments.

Figure 10:
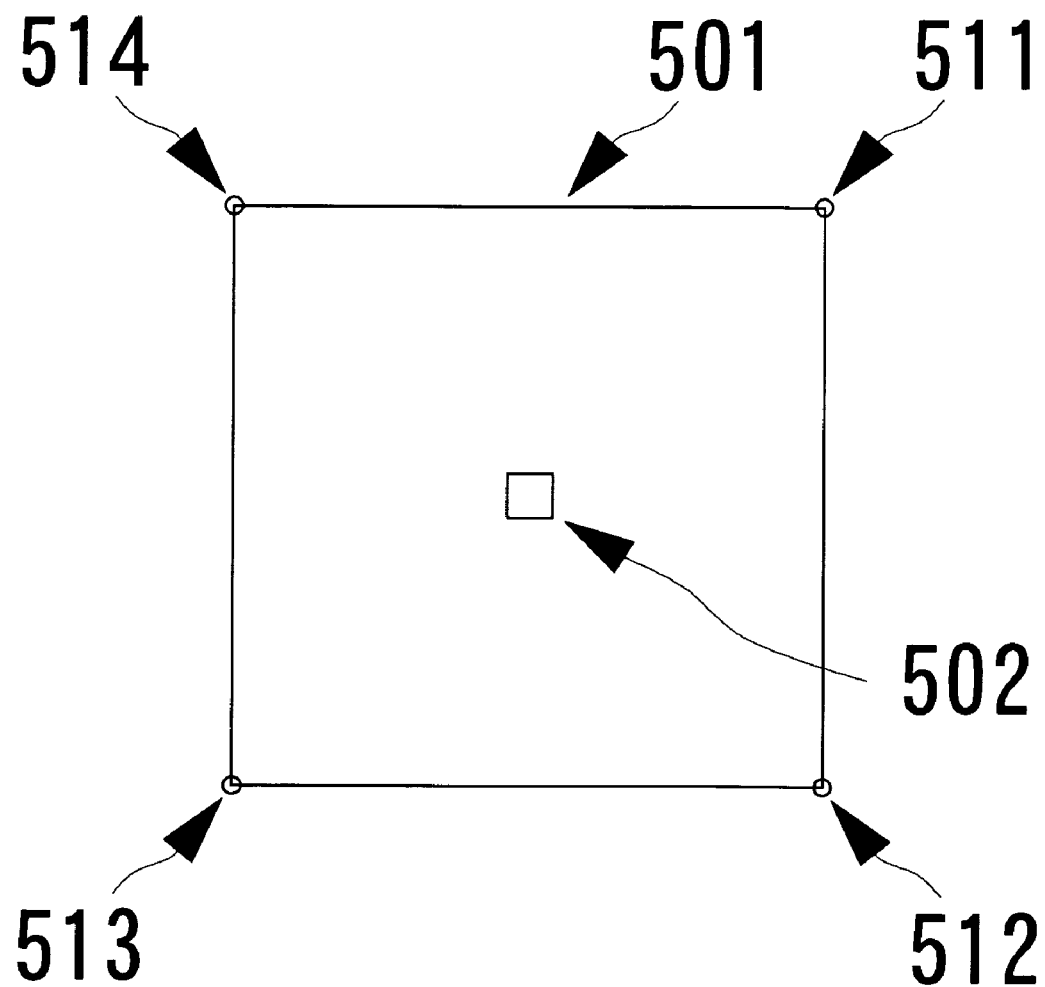
FIG. 10 is a plan diagram illustrating a schematic configuration of a target detecting system for use in an oilfield drilling apparatus according to a fifth embodiment of the present invention.

FIG. 10 is a plan diagram illustrating a schematic configuration of a target detecting system for use in an oilfield drilling apparatus. FIGS. 11A and 11B are conceptual diagrams illustrating a detection range of each radar antenna.

The drilling apparatus includes an oil platform 501 having substantially a square shape as viewed from the top and an oil drilling machine 502 placed at a center position of the oil platform 501 as viewed from the top. Radar antennas 511, 512, 513, and 514 are provided at the respective corners of the oil platform 501, and each has a horizontal detection center pointing in an outward direction extending through the corresponding corner from the center of the oil platform 501. The radar antennas 511 and 513 are provided on one diagonal of the oil platform 501, while the radar antennas 512 and 514 are provided on the other diagonal of the oil platform 501. The radar antennas 511 to 514 each have a detectable area within a directional range of about 270° (±135° with respect to the horizontal detection center), and a non-detectable area within a directional range of 90° toward the oil platform 501 since the structure is an obstruction.

Figure 11:
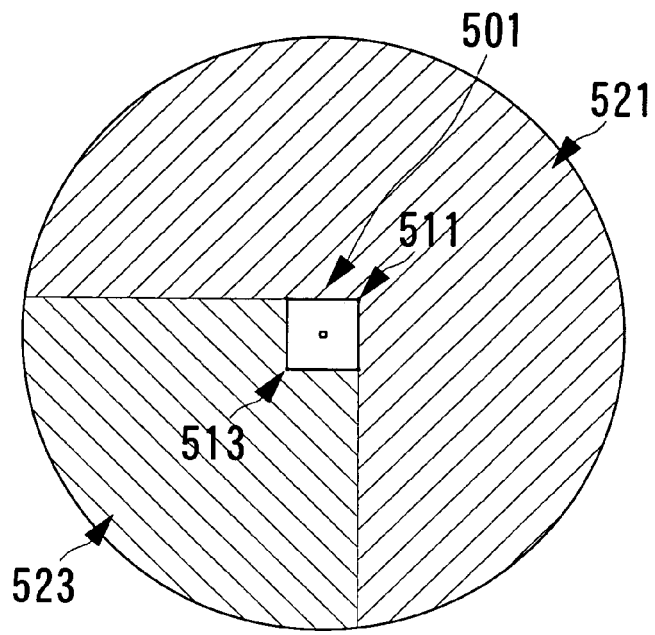
FIGS. 11A and 11B are conceptual diagrams illustrating a detection range of each radar antenna.
Figure 11:
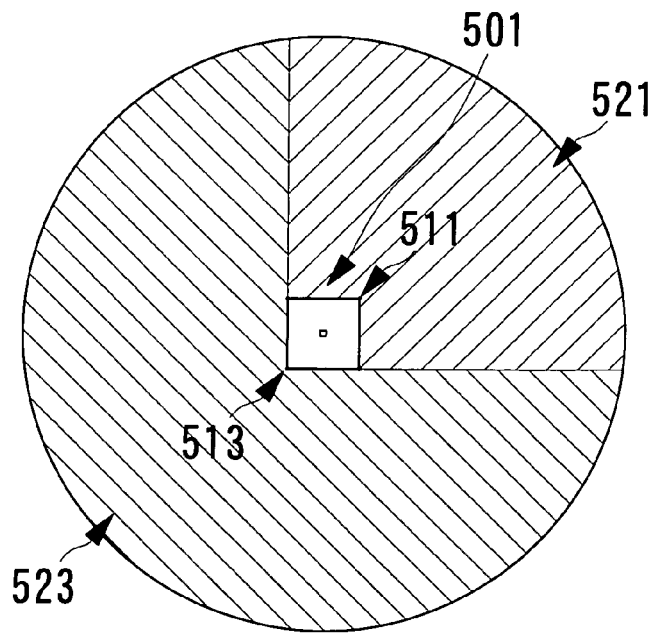
Figure 12:
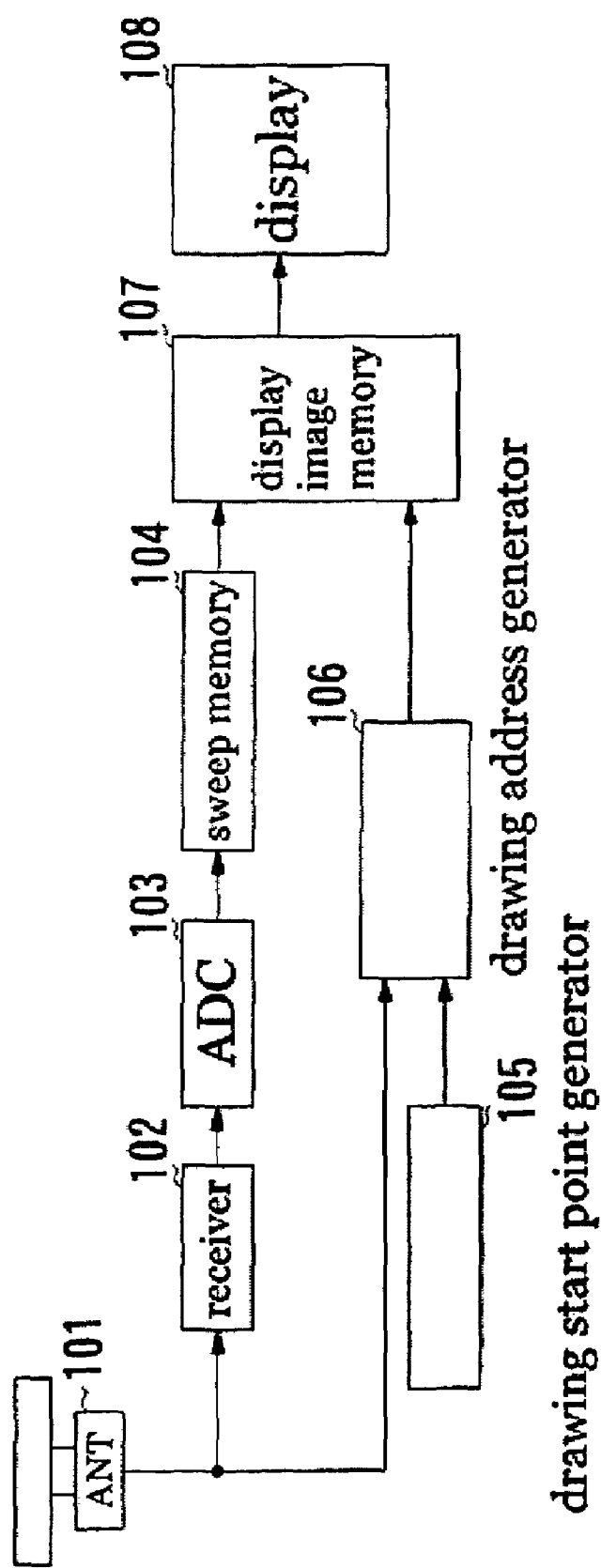
FIG. 12 is a block diagram illustrating a configuration of a conventional general radar apparatus.
Figure 13:
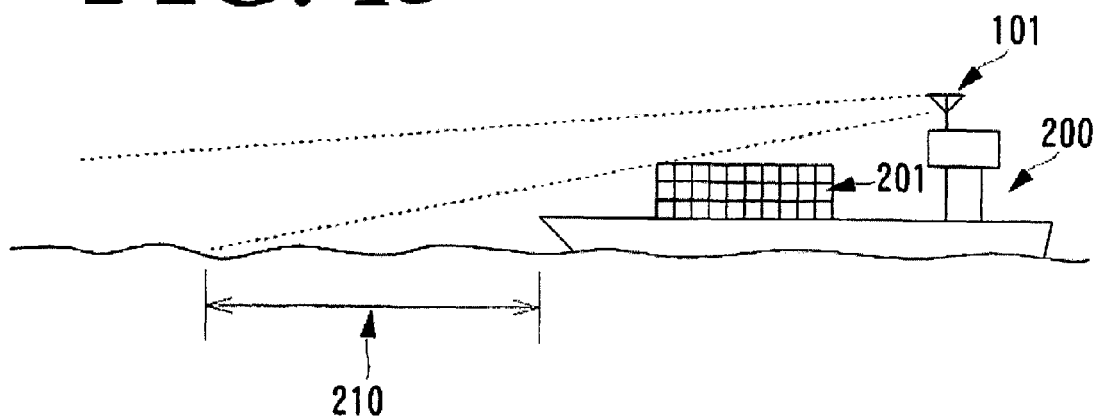
FIG. 13 is a schematic diagram illustrating a non-detectable area due to the positional relationship between an antenna installed position and an obstruction.
Figure 14:
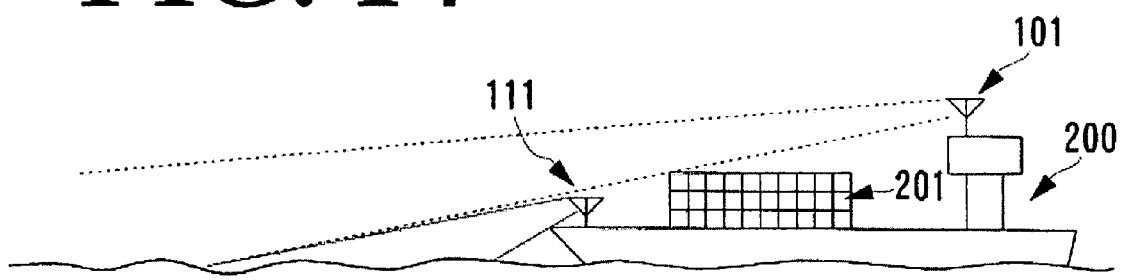
FIG. 14 is a schematic diagram illustrating a detectable area when two radar antennas 101 and 111 are provided.
Figure 15:
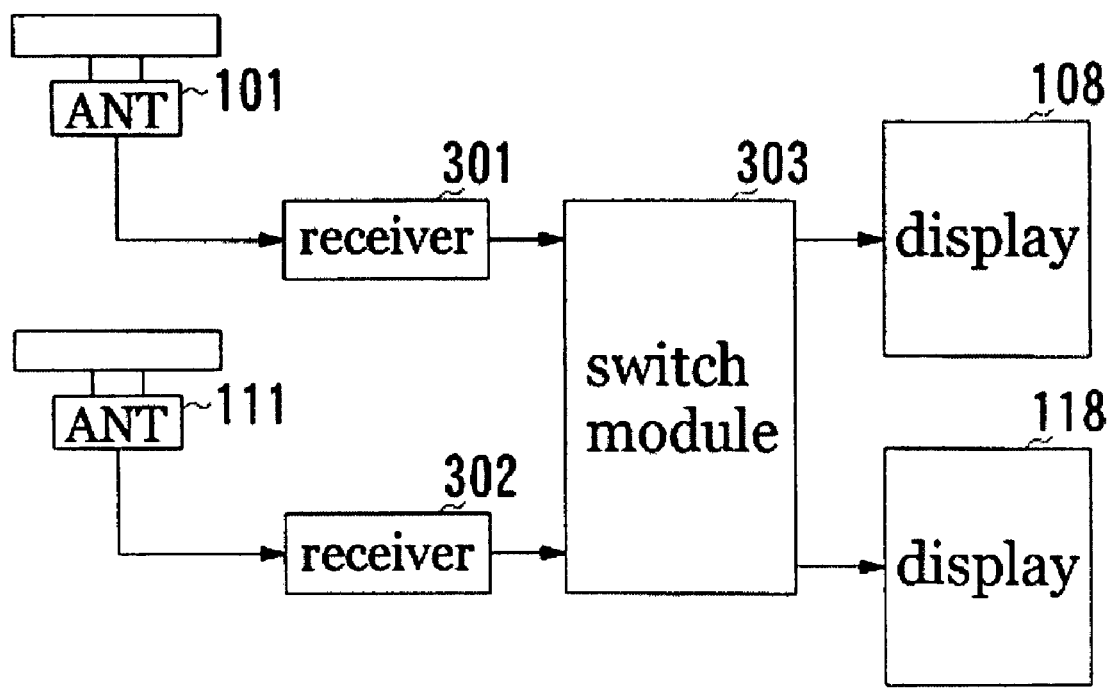
FIG. 15 is a schematic diagram illustrating a configuration of a radar apparatus which changes and displays a plurality of detected images using a switch module 303.

With such a configuration, when only the radar antennas 511 and 513 are used, detected images can be combined as illustrated in FIGS. 11A and 11B. Thus, even when radar detected images are obtained from the separate antenna installed positions, the radar detected images can be correctly and easily combined and displayed in divided areas 521 and 523 which cover all directions around the oil platform 501 and do not overlap each other, on a single display device. Thereby, a target, such as a ship or the like, which is approaching the oil platform 501 can be detected using a plurality of radar antenna installed at separate positions, and detected image data can be easily and correctly combined and displayed on a single display device.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A radar apparatus or like comprising:
   a plurality of detected data generators respectively corresponding to a plurality of antennas installed at different positions, for generating detected data represented by a polar coordinate system using detected signals from the respective antennas;
   a plurality of drawing address generators respectively corresponding to the plurality of antennas, for setting drawing addresses represented by a rectangular coordinate system corresponding to respective antenna relative positions, using azimuth information from the respective antennas, draw start point position information corresponding to the installed positions of the respective antennas, and distance information from a draw start point to a draw position;
   an address selector for selecting the drawing addresses set by the plurality of drawing address generators, and outputting the drawing addresses as drawing addresses or read addresses to a plurality of image data storing memories;
   a plurality of correlators for subjecting the detected data from the respectively corresponding detected data generators to a correlation process, and storing the resultant data in an internal memory as correlated data represented by a rectangular, true motion coordinate system based on the addresses set by the address selector;
   a specific area configurator corresponding to a specific antenna, for setting an area in which detected data obtained by the specific antenna is drawn, using azimuth information from the specific antenna, draw start point position information corresponding to the installed position of the specific antenna, and distance information from a draw start point to a draw position;
   a display image data selector for, among the correlated data output from the plurality of correlators in accordance with a drawing address obtained from one predetermined antenna, selecting and outputting correlated data from a correlator corresponding to the specific antenna to a display image data storing memory, for the area set by the specific area conflaurator, based on a mask image memory associated with said antenna, and selecting and outputting correlated data from a correlator corresponding to an antenna other than the specific antenna to the display image data storing memory, for another area; and
   the display image data storing memory for storing display image data represented by the set true motion display coordinate system; and further, wherein there are more antennas than drawing address generators such that each antenna connected to a drawing address generator is a master antenna, and further wherein at least one master antenna has an associated slave antenna whose scanning and detection cycles are synchronized with said master antenna.

2. The radar apparatus of claim 1, wherein the amount and type of display image data from a slave antenna selected by said display image data selector is determined by the mask image memory of its associated master antenna.

* * * * *